United States Patent [19]

Hoff

[11] Patent Number: 4,467,412
[45] Date of Patent: Aug. 21, 1984

[54] SLAVE PROCESSOR WITH CLOCK CONTROLLED BY INTERNAL ROM & MASTER PROCESSOR

[75] Inventor: Morgan P. Hoff, Santa Clara, Calif.

[73] Assignee: Atari, Inc., Sunnyvale, Calif.

[21] Appl. No.: 264,261

[22] Filed: May 18, 1981

[51] Int. Cl.³ .................. G06F 15/347; G06F 15/44; G06F 9/28
[52] U.S. Cl. ............................... 364/200; 364/521; 364/132; 364/410; 273/DIG. 28; 340/729; 340/727
[58] Field of Search ... 364/200 MS File, 900 MS File, 364/ 131-132, 136, 731, 521-522, 410; 340/723-729; 273/85 G, 135 A, DIG. 28

[56] References Cited

U.S. PATENT DOCUMENTS

| | | | |
|---|---|---|---|
| 4,053,740 | 10/1977 | Rosenthal | 364/705 |
| 4,053,944 | 10/1977 | Dixon | 364/200 |
| 4,078,249 | 3/1978 | Lelke et al. | 364/200 |
| 4,084,233 | 4/1978 | Handly et al. | 364/200 |
| 4,107,665 | 8/1978 | Mayer et al. | 340/324 |
| 4,116,444 | 9/1978 | Mayer et al. | 273/101.2 |
| 4,118,771 | 10/1978 | Pomella et al. | 364/101 |
| 4,148,485 | 4/1979 | Rains | 273/86 B |
| 4,160,973 | 7/1979 | Berlin, Jr. | 340/718 |
| 4,172,281 | 10/1979 | Gordon | 364/200 |
| 4,200,869 | 4/1980 | Murayama et al. | 340/723 |
| 4,209,832 | 6/1980 | Gilham et al. | 364/521 |
| 4,213,189 | 7/1980 | Mueller et al. | 364/900 |
| 4,215,398 | 7/1980 | Burkett et al. | 364/101 |
| 4,241,418 | 12/1980 | Stanley | 364/900 |
| 4,262,336 | 4/1981 | Pritchard | 364/474 |
| 4,268,902 | 5/1981 | Berglund | 364/200 |
| 4,275,441 | 6/1981 | Takeuchi | 364/200 |
| 4,291,380 | 9/1981 | Rohner | 364/522 |
| 4,295,220 | 10/1981 | Blum | 371/61 |
| 4,296,476 | 10/1981 | Mayer et al. | 364/900 |
| 4,298,945 | 11/1981 | Kyte et al. | 364/523 |
| 4,303,986 | 12/1981 | Lans | 364/900 |
| 4,368,514 | 1/1983 | Persaud | 364/200 |
| 4,384,286 | 5/1983 | Di Toro | 340/727 |
| 4,415,928 | 11/1983 | Strolle et al. | 340/727 |

FOREIGN PATENT DOCUMENTS 0068123  5/1983  European Pat. Off. ............ 364/521

OTHER PUBLICATIONS

R. J. Smith, "Bit-Slice Processor Converts Radar Position Co-Ordinates", 4/76, pp. 136–138, (Electronics).
J. W. Jones, "Graphics Processor Using Cordic Algorithm", 2/80, pp. 4082–4085, (IBM Technical Disclosure Bulletin, vol. 22).
R. A. Schulz, "Interactive Graphics Terminal", 10/80, pp. 1770–1779, (IBM Techn. Disclos. Bull., vol. 23).
D. F. Bantz et al., Graphic Transformations of Digital Video Images Using Microprocessors, IBM Tech. Disclos. Bulletin, (vol. 22, No. 3), Aug. 1979, pp. 1301–1302.
Computer Engineering, by Bell, Mudge and McNamara, pp. 332–333.

Primary Examiner—Errol A. Krass
Assistant Examiner—Archie E. Williams, Jr
Attorney, Agent, or Firm—Townsend and Townsend

[57] ABSTRACT

A graphical display of a video game is provided with "first person views" of game play, by generation of simulated three-dimensional perspectives. A slave computational unit relieves a master microprocessor of arithmetic and logical operations necessary for coordinate transformations required to generate the desired video image vectors. Within the slave unit, decoded addresses from the master unit initiate access of microinstructions, from a ROM, which control a dedicated ALU which performs the transformation calculations. When the tasks are finished, the slave processor's clock is turned off by microcode from the slave's own ROM. The results of the slave's computations are retrieved by the master processor and inserted into vector instructions to drive a CRT.

1 Claim, 9 Drawing Figures

SLAVE PROCESSOR WITH CLOCK CONTROLLED BY INTERNAL ROM & MASTER PROCESSOR

BACKGROUND OF THE INVENTION

1. Field of the Invention

The present invention is directed to providing a microprocessor based video game with simulated three-dimensional views and, more particularly, to a computational unit operable by the microprocessor for performing the considerable computation necessary to achieve the effect of different viewing positions and directions necessary to implement a variety of perspective views of an object.

2. Description of the Prior Art

Many of the video games available today provide the player with "third person views" of game play; that is, the player views the play field (the lines and markers that delineate the playing area of the game) and any movable player objects as an observer rather than a participant. This is to be contrasted with "first person views" in which images are presented on a display screen simulating a scene viewed through an imaginary window (represented by the display screen). First person views require some simulation of a third dimension: depth.

First person view simulations have been attempted in some games, but with limited success. For example, certain games provide movable objects, such as simulated aircraft or spacecraft, that are variable in size and position on the screen to simulate changes in relative distance from the player, and side-to-side movement by the player. Typically, however, the modification of the size and screen location of movable objects is the extent of such first person presentation. The limited realism associated with simulated first person views of a playfield with a two-dimensional display makes it desirable to provide a three-dimensional simulation that provides depth and realism.

This is not to say, however, that apparatus does not exist today capable of providing three-dimensional or first person simulations on a two-dimensional display screen. The most common technique used is perspective projection. In this technique an image is formed on the display screen as if viewed by the eye. Flight simulators, for example, are capable of providing simulated three dimensional views from the cockpit of an aircraft. Many images per second are generated to simulate realistic motion in three degrees of freedom (i.e., up/down, left/right, and forward/rearward movements). However, such flight simulators use large, expensive, high powered and fast data processing systems to perform the necessary calculations to provide the simulated views. Accordingly, it is desirable to provide a realistic three-dimensional simulation with an economical system.

Perspective projection views are typically generated in the following manner: digital information describing the view is stored in a data processing memory and referenced to a three-dimensional coordinate system termed the "model" or "playfield" system. To simulate changing views, the binary information must be transformed from the playfield coordinate system to the viewpoint or viewer's coordinate system. Then, the image in the viewer's coordinate system is projected onto a display screen. Thus, the viewer is presented with a display that simulates what he or she would see through a window. Movement of objects in the playfield system, relative to the viewer's position on the playfield, require continuous recalculation of the transformations.

These transformations are performed by calculations that convey depth by providing for a perspective foreshortening of object lines to make distant objects smaller than nearer objects, depending upon the relative position of the viewer and the object viewed. Ambiguities can be eliminated by using hidden line elimination techniques in which lines hidden from view by simulated opaque objects are deleted. This added technique, however, again adds to the computations necessary for presenting the desired view. These topics and the equations necessary for the transformation can be found in *Principles of Interactive Computer Graphics*, Second Edition, by William M. Newman and Robert F. Sproull, published by McGraw-Hill.

Flight simulators, such as those discussed above, are provided with large-scale data processing systems having the computational power and speed necessary to make the required calculations while at the same time controlling the other operational requirements of the system.

Unfortunately, these data processing systems are too large and too expensive to be used in connection with those video games typically found in the home or in arcades. Such video games are controlled by a microprocessor in order to keep down cost and size; and the microprocessors available today do not possess the computational power and speed necessary to perform the transformations necessary to simulate three-dimensional views, yet still maintain control over game play.

SUMMARY OF THE INVENTION

The preferred embodiment of the present invention provides a microprocessor based game capable of generating perspective views of one or more objects to simulate depth and realism and, thereby, provide first person views of game play. Broadly, the invention includes a microprocessor and display circuitry operable by the microprocessor to generate signals used to drive a vector or video CRT display unit, and a computational unit addressable by the microprocessor and structured to accept data from the microprocessor and quickly compute the parameters necessary for the various transformations required to display variable perspective views of objects. The arithmetic operations performed by the computational unit are independent of the microprocessor, thereby leaving the microprocessor free to perform other game control functions.

In the preferred embodiment, the invention is operated in the context of a game system that utilizes a vector generator to control an electron beam of a cathode ray tube (CRT) to "draw" the images displayed. The vector generator develops voltages that represent beam positions on the CRT. By varying these voltages, and the intensity of the beam, the beam can be caused to write a series of lines that describe one or more images or objects. The vector generator operates in response to a list of vector instructions provided by the microprocessor. These instructions contain information concerning beam positions and, therefore, the location of the images, on the CRT.

The microprocessor supplies the computational unit with the position of the image or images in the model coordinate system. The computational unit then performs the necessary arithmetic operations to transform these points from the model coordinate system to the viewer's coordinate system and projection onto an imaginary screen. The microprocessor retrieves the results, inserts it in appropriate ones of the vector instructions, and writes those instructions to the vector generator.

The computational unit is structured specifically for performing the computations required to affect the transformation quickly and independently of the microprocessor. The computational unit includes an arithmetic logic unit (ALU) and associated circuitry for performing the necessary arithmetic and logic operations, a microinstruction memory for containing microinstructions used to control the ALU, and a sequencer for generating address signals that, when applied to the microinstruction memory, select those memory locations containing the microinstructions necessary to direct the ALU to perform one or more of the available arithmetic/logic operations.

The computational unit operates in response to receipt of predetermind address information generated by the microprocessor. There are a number of addresses assigned to the computational unit; and each address corresponds to a predetermined arithmetic or data handling operation to be performed by the computational unit. Receipt of one of the predetermined microprocessor generated addresses by the computational unit will cause it to execute a specific microinstruction sequence. The last microinstruction of the specified sequence will halt the operation of the unit and place it in a standby condition until the microprocessor generates another of the predetermined addresses.

A number of advantages are obtained by the invention. First, the microprocessor is relieved of the computational operations necessary for effecting the transformation or providing a simulated, changing three-dimensional view. The microprocessor merely writes the parameters to the computational unit, and performs other game play operation functions while the computational unit calculates the transformation. When the computational unit is finished, the microprocessor reads the result of the performed computations, inserts those results in one or more vector instructions, and writes the instructions to the vector generator.

A further advantage of the present invention is the provision of a microprocessor based system capable of providing a system capable of generating display objects with variable perspective foreshortening of the object line to simulate three-dimensional display of the object.

These and further objects and advantages of the present invention will become readily evident after reviewing the following detailed description of the invention, accompanied by the attached drawings.

DESCRIPTION OF THE PREFERRED EMBODIMENT

Figure 1:
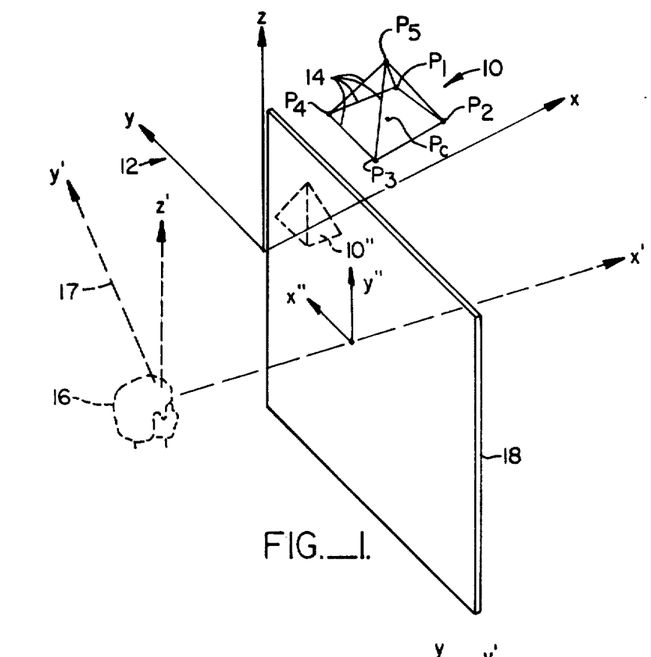
FIG. 1 illustrates the coordinate systems of a playfield object fixed in one coordinate system, the viewer and the interrelationship between the two systems to display the playfield object as a first person view on a display screen.
Figure 2A:
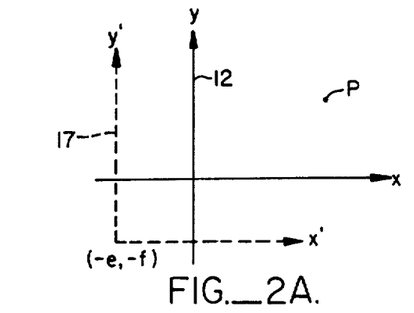
FIGS. 2A and 2B illustrate, respectively, translation and rotation of the viewer coordinate system relative to the playfield coordinate system.
Figure 2B:
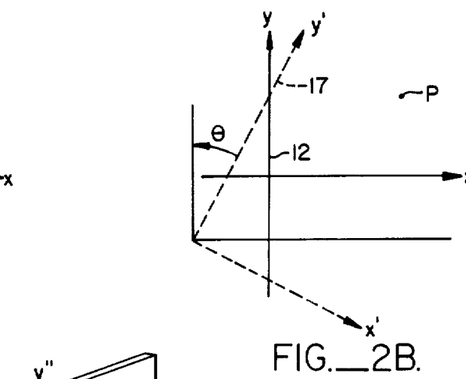
Figure 3:
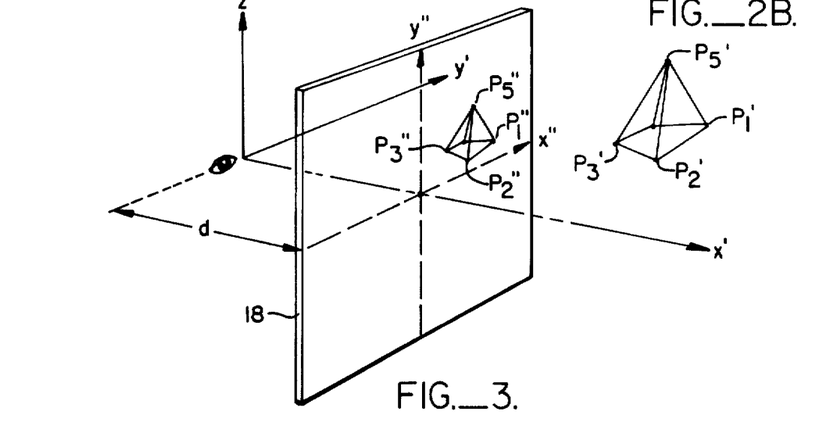
FIG. 3 illustrates the projection of each point of an object onto a representative display screen plane to obtain a perspective display.

Before describing the invention, and in order to set the stage for a better understanding of the invention, the following discussion will first describe, with reference to FIGS. 1-3, a simplified form of a preferred technique used to obtain three-dimensional display graphic signals. This will be followed by a description of the preferred embodiment of the invention and its use.

1. General

As noted above, the most common techique for providing a three dimensional simulated display on a two-dimensional display screen is via perspective projection. This technique conveys depth by making distant objects or images smaller than nearer images. Object lines, lines that simulate edges interconnecting points of an image, are given perspective foreshortening to present the image on the display screen as having portions nearer the viewer than other portions. The capability of varying the perspective foreshortening of the object lines of one or more images to simulate viewing the image from different viewpoints and distances provides a two-dimensional display with a strong sense of depth and realism, thus giving it a three-dimensional perspective.

The problem is greatly simplified if the scene of the view displayed remains fixed. That is, the observer's point of view does not change relative to the image presented for display. In this simplified situation, data describing the scene can be stored in a memory element, repeatedly accessed, converted to electrical signals in the same manner each time, and displayed.

If, on the other hand, the observer's viewpoint is to change relative to the displayed image, either to simulate bringing the observer nearer to or farther from the image or shifting the observer's viewpoint to the left or to the right of the image, the simulation of depth and realism is debilitated unless changes in perspective foreshortening accompany the viewpoint changes. For example, a perspective view of an image displayed on the upper righthand corner of a two-dimensional display screen will provide the observer with a fixed viewpoint. The scene will present surfaces of the image that are dependent upon the viewpoint. If, then, the observer's viewpoint is to change so that the displayed image moves from the upper righthand corner to, for example, the lower righthand corner of the two-dimensional screen, the observer would expect further exposure of other surfaces of the image which would, in turn, hide previously seen surfaces. Without this feature, merely shifting the object view from one location on the display screen would minimize the illusion of realism.

In order to maintain such a realism, a display system should be capable of modifying the image to represent such viewpoint changes by lengthening certain lines and shortening other lines that form the image to realistically present viewpoint changes of a perspective display. This may be better understood with respect to FIG. 1. Illustrated is a pyramidal image 10 represented by points P1-P5 fixedly located in model coordinate system 12. Joining certain pairs of the points P1-P5 are lines 14 that represent intersecting surfaces of the image 10. Each of the points P1-P5 is located within the model system 12 by coordinates (x, y, z), uniquely positioning those points and the image 10 they represent.

FIG. 1 also illustrates an observer 16 having a viewpoint represented by the coordinate system 17 and viewing the scene on a two-dimensional plane 18 (representing, for example, the viewing surface of a display screen). The image 10 (in the model coordinate system 12) appears as image 10" on plane 18. When the viewpoint of observer 16 changes relative to the image viewed by simulating observer movement toward or away from image 10, or a shift in viewpoint to the left or right of image 10, the transformation of points P1-P5 from model system 12 to plane 18 must taken into consideration these changes. The problem for the display system, therefore, is to transform each of the coordinates (x, y, z) of the points P1-P5 of the object 10 from the model coordinate system 12 to the two-dimensional coordinate system of display screen plane 18 each time such a viewpoint change takes place.

If the viewer's coordinate system coincides with that of image 10 (i.e., the model coordinate system) no transformation is necessary and the coordinates of the points P1-P5 in the model coordinate system are the same as those in the observer's coordinate system. However, if the origins of the respective coordinate systems 12, 17 do not coincide, a transformation must take place to determine the coordinates (x', y', z') of a point in the observer's coordinate system 17, using the coordinates of that point (x, y, z) in the model system 12. Assuming no change in the Z direction, movement of the observer's coordinate systems 17 relative to the model system 12 can be represented by a translation (FIG. 2A) and a clockwise rotation (FIG. 2B). In the first instance of translation, a point P having coordinates (x, y) in the model coordinate system 12 would be located in the viewer's coordinate system 17 by coordinates (x'=x−e, y'=y−f). Thus, e and f function to position the viewer's coordinate system origin with that of the model coordinate system. In the latter case of rotation, a point P located in the model system 12 and having the coordinates (x, y) would be located in the observer's coordinate system 17 as P' and having the coordinates:

$$x' = x \cos \theta - y \sin \theta \qquad (1)$$

$$y' = x \sin \theta + y \cos \theta \qquad (2)$$

where $\theta$ is the clockwise angle of rotation of the observer's coordinate system 17 relative to the model system 12.

If both translation and rotation are effected by relative changes of the viewpoint, the coordinates of the point P' in the viewer's coordinate system 17 are:

$$x' = (x-e) \cos \theta - (y-f) \sin \theta \qquad (3)$$

$$y' = (x-e) \sin \theta + (y-f) \cos \theta. \qquad (4)$$

A perspective display can then be generated by merely projecting each point of the object now located in the observer's coordinate system 17 onto the plane 18, as illustrated in FIG. 3. Thus, each point on the display plane 18 is located by coordinates (x", y") where:

$$x'' = (y'/x')d \qquad (5)$$

$$y'' = (z'/x')d \qquad (6)$$

x', y' and z' are in the observer's coordinate system, and d is the distance from the origin of the viewer's system 17 to the plane 18.

The quantities x', y', z', x", and y" must be computed for each point to be displayed. The microprocessor then takes the results (i.e., x" and y") and inserts the results in an appropriate vector instruction to command a vector generator to position an electron beam of a cathode ray tube (CRT) to the appropriate locations in order to draw the lines 14. It can be seen, therefore, that even for one image, much less a number of images, much computational time is required. This is computational time which cannot be taken by the microprocessor; much of the microprocessor time of most video game systems is used in operating and controlling the game itself. Accordingly, the present invention provides a computational unit dedicated to executing these transformations.

2. The Preferred Embodiment

Figure 4:
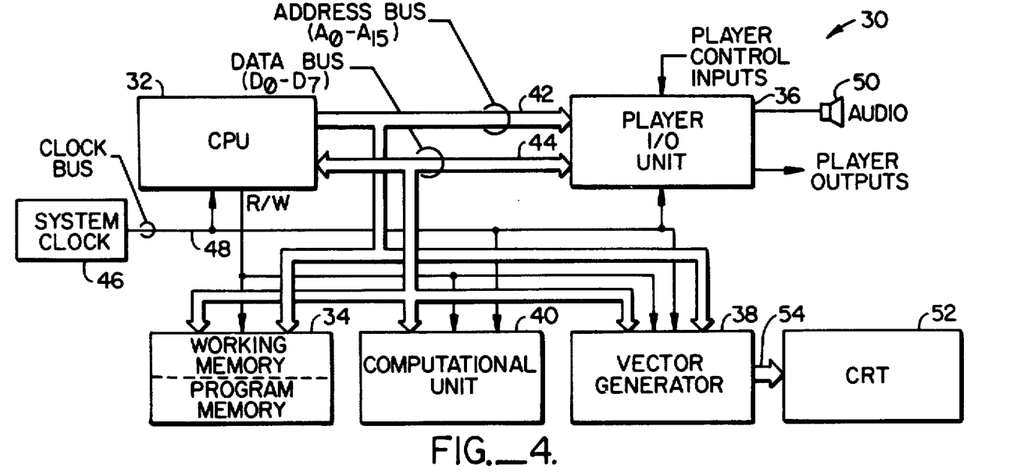
FIG. 4 illustrates the display system incorporating the present invention.

FIG. 4 illustrates, in a simplified block diagram form, a video display system capable of generating perspective, first person views of images. The system, designated generally with the reference numeral 30, functions under the control of a central processor unit (CPU) 32 which executes instructions stored in a memory 34. Other elements of system 30 include player input/output ((I/O) unit 36, a vector generator 38, and a computational unit 40.

A 16-line ($A_0-A_{15}$) address bus 42, an 8-line data bus 44, and a read/write (R/W) line interconnect CPU 32 with the elements of the system in order to provide the CPU with control thereover. A system clock 46 generates a periodic clock signal that is conducted via a clock bus 48 to CPU 32, player I/O 36, vector generator 38, and computational unit 40.

Player I/O 36 and vector generator 38 function as the communication conduits between system 30 and the outside world. Player I/O 36 receives, at player control inputs, player information in the form of signals generated by manipulation of player controls such as joysticks (not shown). The received player information is formatted by player I/O 36, temporarily stored then transmitted to CPU 32 via data bus 44 in response to an instruction from the CPU. Player I/O 36 also receives data from CPU 32 that is used to generate signals for producing a number of audio tones via an audio speaker 50 and for activating other player outputs such as, for example, certain illuminants (not shown) that provide game play information.

Vector generator 38 produces X and Y voltage deflection signals for application to the deflection circuitry (not shown) of a cathode ray tube (CRT) 52 to control the location of the electron beam at all times. Vector generator 38 receives vector instructions formulated and provided by CPU 32 which instructs the vector generator to display specific video signals at particular screen locations. Vector generator 38 produces, in response to the received vector instructions, vectors on the CRT 52 by generating X and Y deflection voltages that deflect the electron beam horizontally and/or vertically. In addition, the vector generator produces an Z output that controls the brightness of the beam. These X, Y and Z signals are coupled to the CRT 52 via the signal lines 54 that interconnect the vector generator 38 and CRT.

System 30 of FIG. 4 receives player information at the player control inputs of player I/O 36. If the perceived player information necessitates a three-dimensional view change (i.e., line foreshortening, etc.) CPU 32 will address computational unit 40 and supply it with the appropriate information and allowing it to perform the calculations required. The results of those calculations will be held by the computational unit 40 until obtained by the CPU 32 and placed by the CPU in one or more vector instructions that are then communicated to the vector generator 38. The vector generator 38 executes the received vector instructions and generates the necessary control signal for effecting the appropriate X,Y control of the beam of the CRT 52.

The many calculations needed to effect a perspective display provides more time for the CPU 32 to formulate the necessary vector instructions transmitted to vector generator 38 and to effect other control over the system 30. Illustrated in greater detail in FIG. 5, computational unit 40 includes a 16-bit arithmetic logic unit (ALU) 60, an arithmetic/logic operator capable of performing the usual arithmetic and logic functions such as, for example, ADD, SUBTRACT (ones complement), DECREMENT, INCREMENT, PASS, AND, OR, SHIFT (left or right) etc. ALU 60 receives 8-bit bytes of data from the CPU 32 via data bus 44 which is connected in parallel to two separate, 8-bit input/output (I/O) ports D1 and D2 of ALU 60. The CPU 32 can also be provided with a byte of data at one of the I/O ports D1 or D2.

Figure 5:
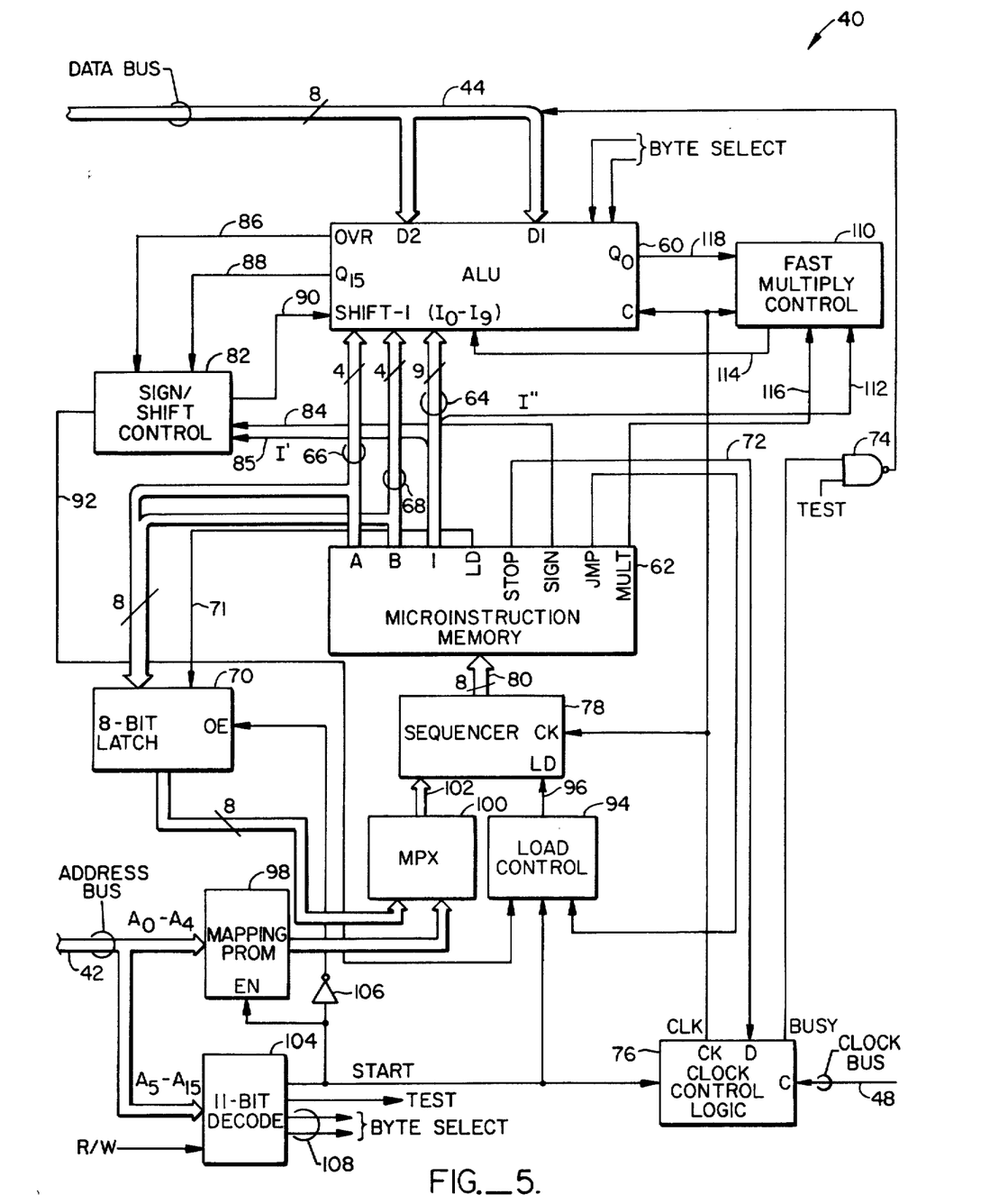
FIG. 5 is a block diagram illustration of the computational unit.

ALU 60 is constructed using four 4-bit microprocessor slices such as, for example, the unit commercially available from Advanced Micro Devices of Sunnyvale, Calif., and sold under the part No. Am2901. The Am2901 device is described in the publication "The AM2900 Family Data Book," published in 1979 by Advanced Micro Devices. The device includes a 16-word by 4-bit random access memory (RAM), a high-speed arithmetic/logic configuration, and associated shifting, decoding and multiplexing circuitry. The device functions in response to a microinstruction word that selects source operands, function, and destination registers.

The ALU 60 is connected to a microinstruction memory 62 by seven instruction control lines 64, and two additional instruction lines I' and I" (coupled to the ALU by circuitry described below) that provide an instruction (I) field to the ALU 60. A pair of 4-bit address lines 66 and 68 each provide a 4-bit output (outputs A and B, respectively) from the microinstruction memory 62 to ALU 60. The signals presented on the signal lines 66 and 68 are used to select various registers (not shown) contained within ALU 60 as operand sources or result destinations of operations performed by ALU 60. The A and B outputs of microinstruction memory 62 are also coupled to an 8-bit latch 70, whose function will be described below.

The microinstruction memory 62 is implemented using six programmable-read-only-memories (PROM.), each having a storage capacity of 256×4 bits. Such memories are commercially available from, for example, Signetics Corporation of Sunnyvale, Calif., and sold under the part No. 82S129. The PROM.s are electrically coupled to one another to provide a 24-bit data word (only a portion of which is illustrated in FIG. 5) in response to an 8-bit address.

Other outputs of the microinstruction memory 62 include the single bit load (LD), STOP, SIGN jump (JMP), and multiply (MULT) outputs. The LD output is connected to an 8-bit latch 70 by a signal line 71 to provide a signal that causes the latch to accept and temporarily store the information then appearing on the signal lines 66 and 68. The STOP output provides a signal that is coupled to the microinstruction memory 62 via a signal line 72 to one input of an AND gate 74 and to a disable (D) input of a clock control circuit 76.

The clock control logic 76 receives, at a clock (C) input, the clock signal generated by the system clock 46 and conducted to the computational unit 40 via the clock bus 48. The clock control logic selectively passes the signal applied to the C input as an internal clock CLK signal to the C input of the ALU 62 and to the CK input of a sequencer 78. Clock control logic 76 also generates a BUSY signal that is coupled to one input of an open collector NAND gate 74.

The sequencer 78 is a presettable counter that responds to the CLK signal to produce a sequence of address signals that are coupled to the microinstruction memory 62 by signal lines 80. The address signals so generated sequentially access the microinstructions contained in the microinstruction memory 62.

The SIGN output bit, as well as the I' bit of the I field, of the microinstruction memory 62 are coupled to a sign/shift control circuit 82 via signal lines 84 and 85. The sign/shift control circuit also receives the overflow (OVR) and most significant output bit ($Q_{15}$) from ALU 62 on signal lines 86 and 88, respectively, and one of the I field bits, I', from the microinstruction memory 62. The sign/shift control circuit functions, during multiplication and division operations performed by ALU 60 to generate a signal that is conducted on signal line 90 to a SHIFT-1 input of the ALU 60 to effect a 1-bit shift of an operand, as dictated by the previous operation.

A signal is also generated on an output line 92 of the sign/shift control circuit 82 that is coupled to a load control circuit 94 which, in turn, is connected to the load enable (LD) input of the sequencer 78 via signal line 96. Load control circuit 94 functions, in response to signals received thereby, to cause sequencer 78 to be preset with that information then appearing on signal lines 102 from a multiplex unit (MPX) 100. Sequencer 78 may be preset with the content of the 8-bit latch 70 or data from a mapping programmable read only memory (PROM) 98. MPX 100 is, in effect, a WIRE-ORed arrangement of the signal lines from 8-bit latch 70 and mapping PROM 98, and the multiplex operation is effected by selectively enabling the outputs of either 8-bit latch 70 or mapping PROM 98, while disabling the other.

Mapping PROM 98 receives the five least significant bit signal lines ($A_0$–$A_4$) of the address bus 42. Mapping PROM 98 also receives a START signal at its enable (EN) input from an 11-bit decode circuit 104. The signals applied via address bus 42, in conjunction with the START signal, produce from mapping PROM 98 an 8-bit microinstruction address designating the first of a sequence of microinstructions stored in microinstruction memory 62. It should be noted that the START signal generated by 11-bit decode circuit 104 is also communicated to the output enable (OE) input of the 8-bit latch 70 via an inverter 104. The START signal is binary in nature and, depending upon its state at any particular time, will selectively enable the output of either mapping PROM 98 or 8-bit latch 70 while disabling the other of each to be communicated to sequencer 78 via the MPX 100.

Of the 65,536 individual addresses capable of being generated by CPU 32 (of FIG. 4), a predetermined few are assigned the function of calling and requesting computational unit 40 to perform particular operations such as, for example, receiving an 8-bit data word presented on data bus 44, at one or the other of the data inputs D1 or D2 of ALU 60, and storing the data word in an internal data register (not shown) of the ALU. Alternately, the operation requested of computational unit 40 may be an arithmetic operation, using data previously written to and stored in the internal registers of ALU 62. Each operation is performed in response to a sequence of microinstructions read from the microinstruction memory 62. The appropriate microinstruction sequence is designated, in turn, by an address generated by CPU 32 and coupled to the computational unit 40 by address bus 42. This address selects the desired microinstruction sequence (and the corresponding operation). 11-bit decode circuit 104 receives eleven signal lines $A_5$-$A_{15}$ of the address bus 42 and the R/W signal line from CPU 32 (FIG. 4). These received signals are decoded by 11-bit decode circuit 104 and, if verified as designating that an operation is to be performed by computational unit 40, 11-bit decode circuit 104 will issue a START signal that is applied to clock control logic 76.

The 11-bit decode circuit 104 also generates on a pair of signal lines 108 a BYTE SELECT signal that is conducted to ALU 60. The BYTE SELECT signal selects one of the I/O ports D1 or D2 of ALU 60 either as an input for receiving a byte of information from data bus 44 or as an output for data to be read by CPU 32. In this respect, the devices used to implement ALU 60, i.e., the 4-bit microprocessor slices, are typically provided with three-state data outputs. The data outputs are connected directly to the data inputs to form bidirectional I/O ports D1 and D2.

11-bit decode circuit 104 also generates a TEST signal that is applied to a remaining input of the NAND gate 74. The output of NAND gate 74 is "wire-ORed" to the most significant bit signal line of data bus 44 (i.e., $D_7$). The TEST signal is generated to determine whether computational unit 40 is in a busy condition by, in effect, looking at the BUSY output of clock control circuit 166. As will be seen, when computational unit 40 ceases operation, it comes to a complete halt that can be identified by the logic state of the STOP bit output of microinstruction memory 62. This logic state of the STOP output is applied to the clock control logic and, in effect, becomes the BUSY signal.

Multiplication speed is increased by a fast multiply circuit 110 that receives, on signal lines 112 and 114, the I" and MULT, respectively, outputs from microinstruction memory 62. Additionally, fast multiply circuit 110 receives CLK on signal line 116 from the clock control logic 76 and a $Q_0$ output (the least significant bit of the ALU) from ALU 62 on signal line 118. The fast multiply circuit 110 functions to modify the I" signal of the I field provided by the microinstruction memory 62, returning, in effect, the I" signal to the $I_0$-$I_7$ inputs of ALU 62 via a signal line 119, causing the ALU 62 to perform simultaneous add and shift operations during execution of multiply instruction.

Figure 6:
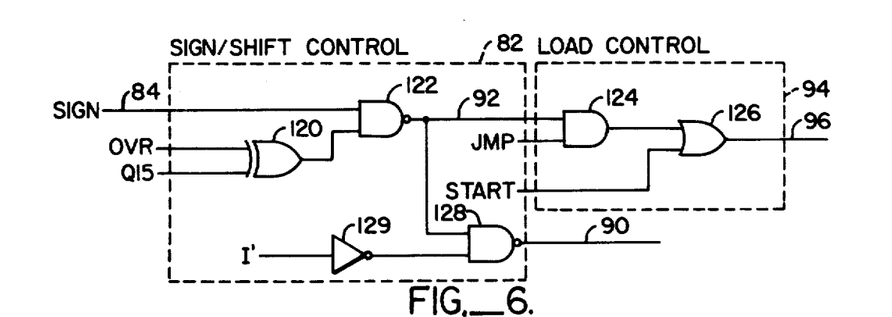
FIG. 6 is a schematic illustration of the logic of the sign/shift control and Load control circuits of FIG. 5.

Sign/shift control unit 82 is used during divide operations to perform a conditional jump, depending upon the sign of the arithmetic operation then being performed by ALU 60. Sign/shift control 82 is shown in FIG. 6 as including an EXCLUSIVE-OR gate 120 and NAND gate 122. The output line 92 of the sign/shift control circuit 82, which is the output of the NAND gate 122, is coupled to load control 94 and applied to an input of an AND gate 124, the output of which is applied to an input of an OR gate 126. The output of OR gate 126 is also the output of load control 94, and is coupled on output line 96 to the EN input of sequencer 78. A logic ONE on output line 96 causes sequencer 78 (FIG. 5) to be preset with an 8-bit microinstruction address from either 8-bit latch 70 or the mapping ROM 98, depending upon the state of the START signal from 11-bit decode circuit 104 as explained.

In order to ensure that, during right shift operations by ALU 60, the proper data bit is shifted into the most-significant-bit position (MSB) of the shifted quantity, sign/shift control 82 receives and modifies the I' bit to provide this new MSB. Thus, sign/shift control 82 also includes a two-input AND gate 128 that receives at one input signal line 92; at the other input thereof is applied the I' bit via an inverter 129. The signal generated by the AND gate 128 forms the data bit that is shifted into the MSB position during both logical and arithmetic right (one-bit) shifts. Thus, AND gate 128 is coupled to the SHIFT-1 input of the ALU 60 by the signal line 90.

As is well known, a division operation is performed digitally by a sequence of subtractions and/or additions. In a microprogram sequence structured to operate ALU 60 to perform a division routine, it is often necessary to perform one or another of a sequence of instructions, depending upon the arithmetic sign of the last operation performed by ALU 62. One of the sequences could immediately follow microinstruction presently appearing at the outputs of microinstruction memory 62, in which case sequencer 78 need merely be incremented. However, if the other of the microinstruction sequences must be used, a "conditional" jump must be effected. Prior to the conditional jump, 8-bit latch 70 is provided with the address of the jump address by a microinstruction whose A and B fields designate the desired address and with the LD bit set to a state that loads the address into the 8-bit latch 70. Subsequently, a conditional jump is executed by a microinstruction that has the JMP and sign output bits set at logic ONE. The SIGN output of microinstruction memory 62 operates in conjunction with the NAND gate 122 of sign/shift control 82 to selectively invert and transmit the result of the EXCLUSIVE OR gate 120.

Thus, when the JMP output of microinstruction memory 62 is a logic ONE and the OVR and Q15 outputs are of the same state, AND gate 124 generates a logic ONE that is communicated via OR gate 126 to preset sequencer 78. At this time, the START signal is typically a logic ZERO. Accordingly, the OE input of the 8-bit latch 70 is at a logic ONE, enabling the content of the 8-bit latch to be conducted to the sequencer via the MPX 100 and address lines 102. In this manner, a jump, conditioned upon the OVR and Q15 outputs of ALU 60 is effected. Alternately, an unconditional jump can also be accomplished when the JMP output bit of the microinstruction memory 62 is a logic ONE and the SIGN output bit of the memory is a logic ZERO.

Figure 7:
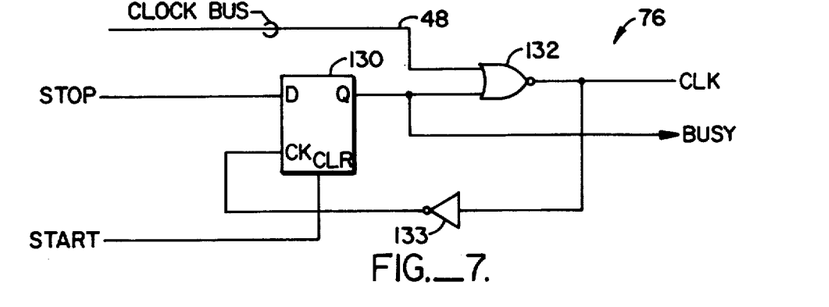
FIG. 7 is an illustration of the clock control logic used to control transmission of clock signals to various component circuits of the computational unit of FIG. 5.

Operation of the computational unit 40 depends upon the presence or absence of the CLK signal delivered to ALU 60 and sequencer 78 by clock control logic 76, shown in greater detail in FIG. 7. As illustrated, clock control logic 76 includes a flip-flop 130 and a NOR gate 132. The Q output of the flip-flop 130, which is the BUSY signal that is applied to NAND gate 74 (FIG. 5), is connected to an input of the NOR gate 132. A second input of the NOR gate 132 receives the clock bus 48, which couples the clock signal generated by the system clock 46 (FIG. 4). The output of NOR gate 132 provides the CLK signal that is conducted to ALU 60 and sequencer 78. The output of NOR gate 132 is also connected to the clock (CK) input of flip-flop 130, and the START signal from the eleven-bit decode circuit 104 (FIG. 5) is connected to the clear (CLR) input of flip-flop 130.

The clock control logic 76 functions as follows: assume that initially flip-flop 130 is set so that the Q output is a logic ONE. When coupled to an input of NOR gate 132, the Q output of flip-flop 130 (a logic ONE) disables NOR gate 132, inhibiting the clock signal communicated by clock bus 48.

When an address is generated by CPU 32 that designates an operation for computational unit 40, the 11-bit decode circuit 104 (FIG. 5) validates that address (i.e., address lines $A_5$–$A_{15}$) and generates a START signal that is applied to (among other things) the CLR input of the flip-flop 130, causing the Q output to be set to a logic ZERO. At the same time, the START signal enables the mapping PROM 98 and address lines $A_0$–$A_4$ to select an appropriate microinstruction address. The selected microinstruction address is communicated to and used to preset the sequencer 78, and then applied, via the address lines 80, to the microinstruction memory 62 to access the first microinstruction of a sequence of microinstructions that will direct the computational unit 40 in the performance of the operation selected by the CPU generated address. Typically, all microinstructions of a sequence, except for the last, have a bit which appears at the STOP output bit of the microinstruction memory 62 as a logic ZERO. The STOP output bit is applied to the data (D) input of the flip-flop 130. Thus, after the flip-flop 130 has been cleared, allowing the clock signal to pass through the NOR gate 132, it is inverted by invertor 133 and coupled back to the CK input of the flip-flop 130 to enter the information appearing at the D input thereof. The sequencer 78 is sequentially incremented by the CLK signal, resulting in access of the microinstruction sequence from the microinstruction memory 62. When the operation directed by the sequence is complete, the last instruction of the sequence is structured to have a logic ONE appear at the STOP output bit of the microinstruction memory 62. This logic ONE is communicated to the D input, and when flip-flop 130 receives the CLK pulse the Q output of flip-flop 130 is set to a logic ONE. NOR gate 132 is thereby disabled, the clock signal communicated on clock bus 48 is inhibited from passing through the NOR gate 132, and the CLK signal disappears.

Since sequencer 78 cannot be incremented in the absence of the CLK signal, the last microinstruction of the sequence continues to be addressed and the STOP output bit of the microinstruction remains in a logic ONE state. Computational unit 40 remains in this latched state until a START signal is once again generated.

Overall operation of computational unit 40 generally proceeds as follows: Assume that computational unit 40 is to compute $x'_1$ and $y'_1$ (Equations (3) and (4) above) for the transformation of the point $P_1$ ($x_1$, $x_1$) from model coordinate system 12 to viewer's coordinate system 17 (FIG. 1). CPU 32 must first write the parameters x, y, e, f, cos $\theta$ and sine $\theta$ to computational unit 40. Thus, CPU 32 (FIG. 4) places on data bus 44 the information to be supplied to computational unit 40 and forms an address that is coupled to the computational unit via address bus 42 to cause 11-bit decode circuit 104 to issue the START signal and select the appropriate microinstruction address from mapping PROM 98 for presetting sequencer 78. In response, a microinstruction sequence is selected from the microinstruction memory 62 to effect transfer of 8-bit data word on data bus 44 to the appropriate internal registers (not shown) of ALU 60.

Each parameter is a 16-bit word that is transferred to the computational unit one byte at a time. Accordingly, each address formed by CPU 32 corresponds not only to the transfer of a specified parameter, but to the particular byte of that parameter (i.e., the high byte or the low byte).

As each parameter is written to computational unit 40, the microinstruction sequence corresponding to that parameter ends with a microinstruction that causes a logic ONE to appear at the START output bit of the microinstruction memory 62, stopping operation until computational unit 40 is again addressed by CPU 32. The parameters can be written in any manner. However, in the preferred practice of the invention, one of the parameters—the high byte of the parameter $y_1$, for example—is selected to start the calculation of $x'_1$. This requires, therefore, that all other parameters (i.e., $x_1$, e, f, cos $\theta$ and sin $\theta$), including the low byte of the parameter $y_1$, be previously loaded so that when the high byte of $y_1$ is written computational unit 40 can commence computation of the parameter $x_1'$ via the continuation of the microinstruction sequence that loads $y_1$ into one of the internal registers (not shown) of ALU 60.

When the parameter $x_1'$ is calculated, it is retained in an internal output register (not shown) of ALU 60 and computational unit 40 halts as described above. CPU 32 reads the parameter $x'_1$ (high and low bytes) and then addresses computational unit 40 to initiate calculation of the parameter $y'_1$.

Figure 8:
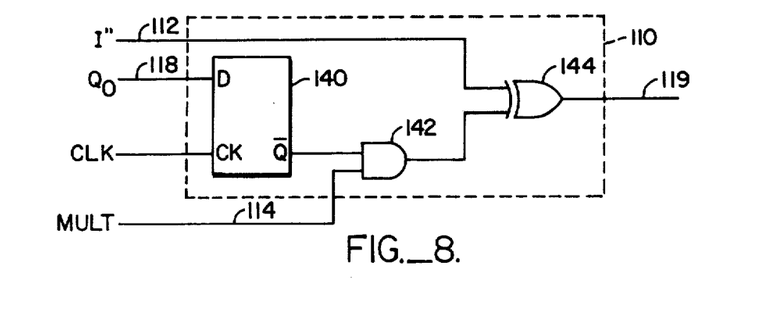
FIG. 8 is a schematic illustration of the logic of the fast multiply control circuit of FIG. 5.

Illustrated in FIG. 8 is the fast multiply circuit 110. As shown, the fast multiply circuit 110 includes a flip-flop 140 that receives at its data (D) input the $Q_0$ output from ALU 62 and the CLK signal at its clock (CK) input. The $\overline{Q}$ is coupled to an input of an AND gate, which also receives at a second input the MULT output of microinstruction memory 62 on signal line 114. The AND gate 142 is coupled to one input of an EXCLUSIVE-OR gate 144, which receives at its second input, via signal line 112, the I'' output from the microinstruction memory 62. The signal produced by the EXCLUSIVE-OR gate 144 is the modified instruction signal that is coupled by the signal line 119 to one of the instruction inputs $I_0$–$I_7$ of the ALU 60 to condition the ALU to perform simultaneous add and shift operations in one clock cycle.

In order to provide CPU 32 with a means of determining whether computational unit 40 is in an operating or stalled condition, a predetermined address is generated by CPU 32 that, when decoded by the 11 bit decode circuit 104, causes issuance of the TEST signal. The TEST signal is coupled to the NAND gate 74 to enable the BUSY output of clock control circuit 76 to be communicated to the data bus 44 where it can be read and tested by the CPU 32. In this manner, the CPU 32 can determine if the computational unit 40 is in an operating or stopped condition.

While the invention has been particularly taught and described with reference to a vector generated game circuit, those versed in the art will appreciate that minor modifications in form and detail may be made without departing from the spirit and scope of the invention. Accordingly, all such modifications are embodied within the scope of this patent as properly come within my contribution to the art and are particularly pointed out by the following claims.

I claim:

1. In a system containing a host processor with a host address bus, a host data bus, and a system clock line, a slave processor and slave address bus comprising:

memory means for storing microinstructions and providing stored microinstructions on a memory output bus in response to addresses presented on said slave address bus, said memory means being a read only memory;

an arithmetic logic unit coupled to at least a portion of said memory output bus, said arithmetic logic unit being adapted to perform arithmetic and logic operations in response to microinstructions provided by said memory means on said memory output bus, said arithmetic logic unit also being coupled to a slave clock line for receiving clock signals;

a sequencer coupled to said slave address bus, said sequencer providing addresses on said slave address bus;

a decoder coupled to said host address bus, said decoder providing a start signal in response to the presence of a predetermined address on said host address bus;

a clock control circuit coupled to said system clock line, said slave clock line, said decoder and at least one output line from said memory means, said clock control circuit sending clock signals on said slave clock line in response to clock signals on said system clock line, terminating the sending of clock signals on said slave clock line in response to the presence of a predetermined condition on said output line, and resuming the sending of clock signals on said slave clock signal line in response to said start signal;

a mapping ROM coupled to said host address bus, said mapping ROM providing an address on a mapping ROM output bus in response to addresses on said host address bus;

a multiplexer coupled to said mapping ROM output bus, said multiplexer providing an output on a multiplexer output bus in response to data on said mapping ROM output bus; and a load control circuit coupled to said sequencer and said start signal output line, said load control circuit causing the loading by the sequencer of the data on said multiplexer output bus in response to a start signal on said start signal output line.

* * * * *